L. W. BUGBEE.
BRIGHT AND BLACK GOGGLES.
APPLICATION FILED OCT. 26, 1917.
1,420,964.
Patented June 27, 1922.
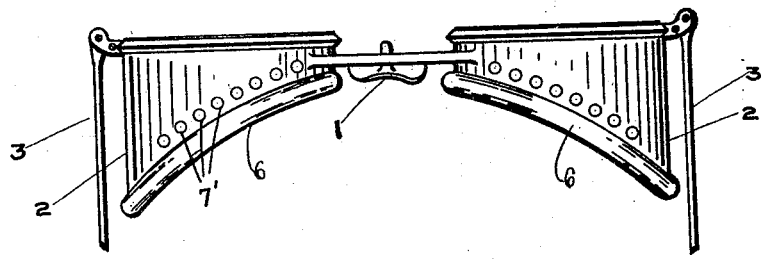
FIG. I
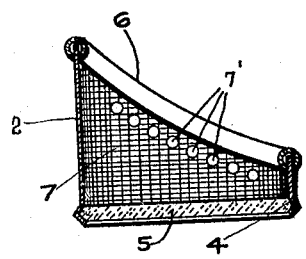
FIG. II
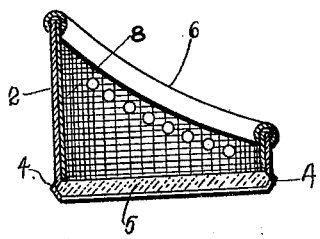
FIG. III
INVENTOR
L. W. BUGBEE
BY,
H. H. Styll, H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BRIGHT AND BLACK GOGGLES.

1,420,964.      Specification of Letters Patent.     Patented June 27, 1922.

Application filed October 26, 1917. Serial No. 198,590.

*To all whom it may concern:*

Be it known that I, LUCIAN W. BUGBEE, a citizen of the United States, residing at Southbridge, in the county of Worcester and State of Massachusetts, have invented certain new and useful Improvements in Bright and Black Goggles, of which the following is a specification.

This invention relates to new and useful improvements in goggles or eye protectors and has for its primary object to provide a pair of goggles that will effectively protect the eyes against all light and heat conditions.

There are various industrial operations, in which the operatives are not only subject to flying particles but to very intense light and heat, and electrical conditions from all of which the eye should be carefully shielded and protected. It is therefore the main object of this invention to provide a pair of goggles wherein the outer surface of the walls are of such a nature as to reflect the heat rays and the inner surfaces will be formed of a material which will radiate the small amount of heat penetrating the walls to the interior of the cup.

Another object of this invention is the provision of a pair of goggles provided with suitable means whereby the heat radiated from the inner walls of the eye cups will be readily circulated to the outside atmosphere.

A further object of the present invention is the provision of a pair of goggles wherein the lenses are of such nature that the infra-red rays of light will not penetrate to the eyes of the person wearing the goggles.

With the above and other objects in view the invention consists in the novel features of construction and the combination and arrangement of parts to be hereinafter more fully described, pointed out in the claims and shown in the accompanying drawings, in which—

Figure I is a side elevation of a pair of goggles constructed in accordance with my invention.

Figure II is a longitudinal sectional view of one cup, or shell of the goggles and Figure III is a similar view illustraing a slightly modified form of shell.

Referring now more particularly to the accompanying drawings the numeral 1 indicates a nose bridge which connects the shells or eye cups 2 said cups having the side temples 3 attached to the outer end thereof whereby the eye cups may be readily applied to the face and securely held in position. The eye cups may be of any suitable shape desired and provided at the outer end with the grooves 4 adapted to receive the edges of the lenses 5 while the other ends of the cups or shells are provided with a padded ring 6 for engagement with the face so as not to irritate or bruise the skin should an object come in contact with the cups.

In the constructions of the cups or shells 2, I prefer to have them made of a comparatively light material such as aluminum, nickel or a similar material and have the inner surface thereof formed of heat radiating material of a dark color. The outer walls of the cups or shells are coated or originally formed with a bright or polished surface which will reflect heat radiations therefrom and thus prevent any intense heat rays from coming in contact with the eyes. It will be apparent that what little heat is absorbed by the cups will be radiated by the inner radiating surface and circulated out through the vent opening 7' formed in the cups or shells 2. It will be noted that by having these vent openings formed in the top and bottom sides of the cups there will be a continuous current of cool air passing over the eyes so that the heat will not come in contact with them. The lenses 5 are preferably formed of a material which will not permit the penetration of the infra-red rays of light, thus thoroughly protecting the eyes from any heat rays.

From the above description taken in connection with the accompanying drawings it will be readily apparent that I have provided a pair of goggles which will effectively protect the eyes against all intense heat conditions. It will be understood that, while I have described aluminum and nickel as the preferred materials to be used in the construction of my improved goggles, I may use any other material containing the same qualifications as the preferred materials.

In Figure III I have illustrated a modified form of the invention wherein I provide a separate lining as shown at 8, for the interior of the cups or shells 2 which will possess a certain amount of heat radiating properties to radiate the small amount of heat which passes through the cups from the outer walls and prevent it from reaching the eyes. This lining may be removable and used where the wearer is first subject to intense heat and light conditions and then to normal conditions so that the goggles can be readily used either with or without the lining.

I do not believe that the idea of using a heat reflecting surface on the outside of the cups or shells of goggles and a radiating surface on the inside thereof has ever been used for a similar purpose, therefore it will be readily apparent that my device will be of great commercial value. It will also be understood that the coating or lining may be either formed integral with the walls of the cups or shells when manufactured or applied thereto afterward.

From the foregoing description taken in connection with the accompanying drawings it will be apparent that I have provided a pair of goggles which will effectively protect the eyes against all heat and light conditions. The outside walls being formed to reflect a certain amount of heat and the inside walls being adapted to radiate what heat passes through the walls, this heat being circulated out through the openings 7' and also the lenses 5 will prevent the penetration of any infra-red rays to the eyes.

I claim:

1. A pair of goggles including eye cups, a lining on the inside of each cup containing heat radiating properties and the outer wall of each cup being formed with a heat reflecting surface.

2. A pair of goggles including eye cups, said eye cups being exteriorly polished to provide heat reflecting surfaces and being interiorly darkened to provide heat radiating sections.

3. A pair of goggles including eye cups, said eye cups being exteriorly polished to provide heat reflecting surfaces and being interiorly darkened to provide heat radiating sections, said cups having ventilation apertures formed therethrough to afford circulation and carry off the radiated heat.

4. A heat protecting goggle for industrial purposes including a pair of eye cups having polished reflecting surfaces opposed to exterior radiations and having a permanently darkened inner radiating surface and front closures for the cups of material impervious to heat radiations.

5. A heat protecting goggle for industrial purposes including a pair of eye cups having polished reflecting surfaces opposed to exterior radiations and having a permanently darkened inner radiating surface and front closures for the cups of material impervious to heat radiations, and ventilation apertures for conducting away the radiated heat.

In testimony whereof I have affixed my signature, in presence of two witnesses.

LUCIAN W. BUGBEE.

Witnesses:
ESTHER M. LAFLER,
H. E. COLEMAN.